A. H. G. FOKKER.
JOINT FOR AEROPLANE WINGS.
APPLICATION FILED FEB. 17, 1921.
1,396,176.
Patented Nov. 8, 1921.
2 SHEETS—SHEET 2.
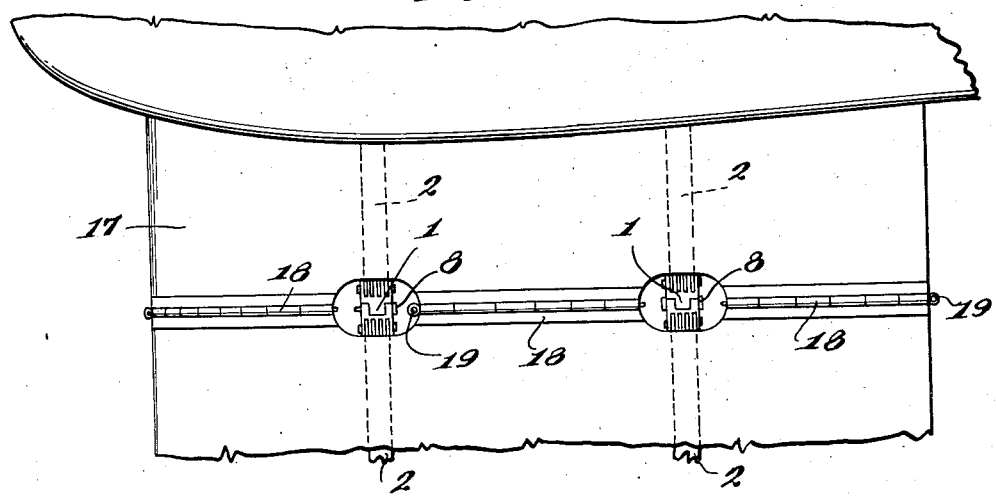
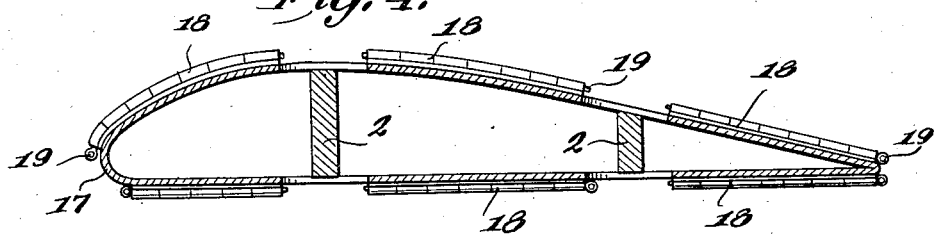
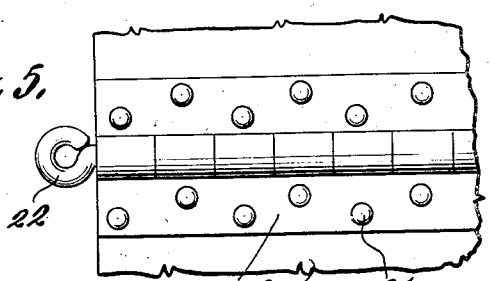

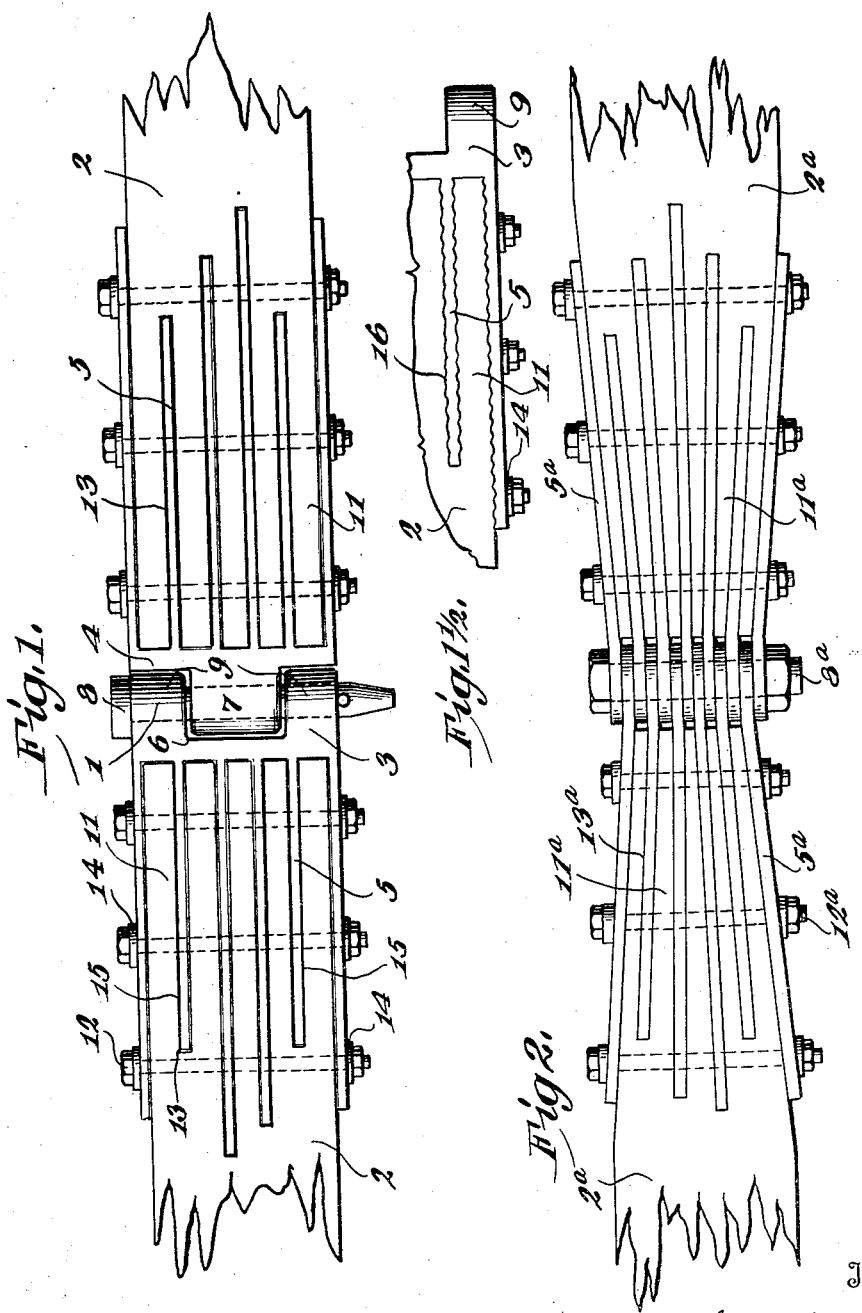

UNITED STATES PATENT OFFICE.

ANTHONY HERMAN GERARD FOKKER, OF AMSTERDAM, NETHERLANDS.

JOINT FOR AEROPLANE-WINGS.

1,396,176.

Specification of Letters Patent.

Patented Nov. 8, 1921.

Application filed February 17, 1921. Serial No. 445,732.

*To all whom it may concern:*

Be it known that I, ANTHONY HERMAN GERARD FOKKER, a subject of the Queen of the Netherlands, residing at Amsterdam, Netherlands, have invented a new and useful Joint for Aeroplane-Wings, of which the following is a specification.

This invention relates to improvements in joints for aeroplane wings, one object of the invention being to effect improvements in the construction of the joints between the ends of the beam members so as to greatly strengthen the same and enable them to withstand the stress in tension and compression, another object of the invention being to effect improvements in the means for joining the covering material of the wing in conjunction with the jointed main wing beams, in order to preserve that part of the strength of cantaliver wings which is provided by the wood or metal covering material sometimes used, and which carries part of the load which is otherwise taken solely by the beams.

In the type of aeroplane supporting surface known as cantaliver or internally braced wings, (i. e. supporting surfaces for planes in which the necessary strength is provided by the structure of the planes or of parts of the planes themselves, without exterior bracing or supports) and in which parts of said planes are so fixed to the other parts or to the structure of the body of the aeroplane that they may be readily detached, it has been found difficult to construct the joint between the said parts of sufficient strength and of sufficiently low weight to be efficiently used in an aeroplane.

In the type of plane where the strength of the structure is mainly provided by a beam or beams in the wing structure the joining of the detachable part of the plane to the other parts is carried out by joining the ends of the said beams to corresponding ends of beams or other parts of the remaining structure.

In cases where the actual means of providing the joint consists of metal parts fixed to the above mentioned beams, it has been found difficult to do so in the case of wooden beams, owing to the high tensile and compressive stresses to which the actual connection between the wood and metal parts is subjected in flight and in landing.

In the present invention the total surface of wood and metal in contact is greatly enlarged and the corresponding increase in friction adds to the strength of the joint in tension and compression.

In the accompanying drawings:—

Figure 1 is a detail elevation of an aeroplane beam joint constructed and arranged in accordance with this invention.

Fig. 1½ is a similar view, showing a modification.

Fig. 2 is a longitudinal sectional view of an aeroplane wing beam joint constructed in accordance with another modification.

Fig. 3 is a plan of a portion of an aeroplane wing provided with beam joints and covering joints in accordance with my invention.

Fig. 4 is a vertical transverse sectional view of the same.

Fig. 5 is a detail plan of the covering joint.

Fig. 6 is a detail sectional view of the same.

Fig. 7 is a similar view showing a modification.

Referring particularly to the form of the invention shown in Fig. 1, the coupling device 1, which is made of metal, and which connects the opposing ends of a longitudinal aeroplane wing beam or beams 2, comprises a pair of members 3, 4, each of which is provided with a series of spaced laminations 5 of suitable length and which are here shown as of unequal length. The member 3 has a recess 6 and the member 4 has a projection 7 which fits in said recess. A pin or bolt 8 is inserted in alined openings in said projection and in the shoulders 9 of the member 3, so that the said members 3, 4 are detachably secured together.

The wooden beams or beam members 2 are provided in their opposing ends with spaced slots 13 to receive the laminations 5 and hence the said beams are provided with wooden laminations 11 which are arranged alternately with the metal laminations 10 of the coupling device. Suitable bolts 12 extend transversely through the laminations 10, 11 and securely clamp the same together. Resilient washers 14 which may be spring washers or made of any suitable elastic substance, are fitted between the heads and nuts of the bolts and the outer laminations 10, in order to keep pressure on the laminations in the event that the wooden laminations should slightly shrink. Glue or other suitable adhesive substance may be placed between the laminations as indicated at 15 in Fig. 1, and the laminations may have their opposing surfaces roughened or corrugated as indicated at 16 in Fig. 1½.

In Fig. 2 I show a modification in the construction of the aeroplane beam joint in which the wooden beam members 2ª are narrowed toward their ends and provided with correspondingly angularly arranged wooden laminations 11ª which are correspondingly narrowed toward their outer ends.

The metal coupling device in this form of the invention comprises plates or laminations 5ª which are arranged in the slots 13ª, are secured in place by bolts 12ª, and the outer ends of which are arranged alternately and in overlapping relation and are secured together by a coupling bolt 8ª.

It will be understood from the foregoing that my improved aeroplane wing beam joint is exceedingly strong and at the same time light, and is capable of sustaining or enduring successfully all the compression or tensile stresses to which it may be subjected either during flight or in landing.

In further accordance with my invention in the case of a wing construction in which it is desired to connect not only the beam ends but also the covering material 17 of the two parts of the wing, the ends of the beams are connected by joints of the types hereinbefore described, and the edges of the covering where they abut at the wing joints are so shaped as to form integral hinge members 18 through which hinge pins, or pintles or draw wires 19 are passed, as indicated in Fig. 3.

In Figs. 5 and 6 I show a slight modification in which hinge plates 20 are employed instead of the integral hinge members 18, said hinge plates being secured to the covering 17ª by rivets 21, and being connected together by detachable hinge pins, pintles or draw wires 22.

Such covering joints in connection with the jointed main wing beams effectually preserve that part of the strength of the cantaliver wing which is provided by the wood or metal covering material sometimes used and which carries part of the load which would be otherwise taken solely by the beams.

While I have herein shown and described the preferred embodiments of my invention, I would have it understood that changes may be made in the form, proportion and construction of the several parts without departing from the spirit of my invention and within the scope of the appended claims.

What I claim is:—

1. In an aeroplane wing, beam members arranged with their ends spaced apart and provided with longitudinal spaced slots forming laminations between said slots, and a coupling device between the ends of the beam members and having spaced laminations arranged in the slots thereof.

2. In an aeroplane wing, beam members arranged with their ends spaced apart, and a coupling device securing said ends together, said beam members and coupling device having laminations arranged in mutual contact and alternate relation.

3. In an aeroplane wing, wooden beam members arranged with their ends spaced apart, and a coupling device securing said ends together, said beam members and a metallic coupling device having laminations arranged in mutual contact and alternate relation.

4. In an aeroplane wing, beam members arranged with their ends spaced apart and provided with longitudinal spaced slots forming laminations between said slots, and a coupling device between the ends of the beam members and having spaced laminations arranged in the slots thereof, said coupling device comprising detachable members.

5. An aeroplane wing comprising detachable sections each including beam members and a covering, coupling devices between the ends of said beam members, and detachable hinge connections between the meeting edges of the coverings.

In testimony whereof I affix my signature in presence of two witnesses.

ANTHONY HERMAN GERARD FOKKER.

Witnesses:
ROBERT C. MOODEY,
F CUMER.